United States Patent Office 3,275,548
Patented Sept. 27, 1966

3,275,548
REMOVAL OF DISSOLVED SUBSTANCES FROM AQUEOUS DISPERSIONS
Harold A. Walters, Beaverton, Mich., assignor to The Dow Chemical Company, Midland, Mich., a corporation of Delaware
No Drawing. Filed Aug. 14, 1963, Ser. No. 302,009
5 Claims. (Cl. 210—24)

This invention relates to the removal of dispersed materials from aqueous substances. It more particularly relates to the removal of dispersed materials from aqueous systems utilizing a particulate adsorbent.

Many processes generate aqueous dispersions having undesired components dissolved or dispersed therein. Such dissolved or dispersed materials oftentimes are not readily removable from the aqueous phase by convenient means. For example, water containing detergents and like organic substances may be purified by adsorbing the detergent or organic material on a high surface adsorbent. However, regeneration of the adsorbent is frequently difficult and requires treatment by heating or chemical means. Oftentimes aqueous dispersions containing dissolved material or extremely small suspended material as contaminants have large suspended bodies as a desirable portion of the system. For example, synthetic latex oftentimes has present therein a relatively large amount of a water-soluble or dispersible wetting agent which serves to mechanically stabilize the polymer dispersion. By the term "mechanically stabilize" is meant that the dispersion is stabilized sufficiently so that it may undergo normal mechanical treatments such as shipping, low shear pumping and the like. The presence of the dispersing or stabilizing agents in the synthetic latex frequently leads to many undesirable characteristics, such as water spotting, in the resultant product. Water spotting occurs when a layer of the aqueous polymer dispersion is dried to form a continuous film and at some later time water is brought into contact with the surface of the film and a whitening or discoloration occurs in what otherwise is a relatively transparent or translucent coating. For many commercial applications water spotting renders a synthetic latex or polymer dispersion unsuitable for use. Other situations exist where colloidal suspensions in water are extremely undesirable, for example, in the clarification of beverages considerable difficulty has been encountered and oftentimes chemical means are employed to remove the undesired colloidal material. Such chemical means frequently met with objections from public health authorities and involved expensive testing. Attempts to filter such material from the liquid are time consuming and expensive.

It is an object of this invention to provide an improved method for the separation of dissolved or dispersed organic materials from aqueous dispersions.

It is a further object of the invention to provide a physical means of providing the separation without the necessity of subjecting the treated material to severe mechanical conditions or undesired elevated temperatures.

It is a further object to provide a method for the removal of organic components from an aqueous dispersion wherein a readily regenerative adsorbent is utilized.

These benefits and other advantages in accordance with the present invention are readily achieved by separating dispersed organic material having a molecular dimension of less than about 300 Angstroms from an aqueous dispersion comprising contacting the aqueous dispersion with a finely divided adsorbent comprising a plurality of synthetic resinous sphere-like particles, the synthetic resinous particles having a plurality of pores ranging up to about 300 Angstroms in diameter.

Suitable resinous particles for the practice of the invention are readily prepared from a wide variety of polymerizable materials. Particularly advantageous are the alkenyl aromatic monomers. By the term "alkenyl aromatic" is meant an alkenyl aromatic compound having the general formula:

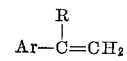

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, ortho - methylstyrene, meta - methylstyrene, para-methylstyrene, ar-ethylstyrene, ar-vinylxylene, ar-chlorostyrene, or ar-bromostyrene and the like.

The acrylate monomers alone or in combination with the alkenyl aromatic monomers may also be utilized. Such acrylate-type monomers include monomers of the formula:

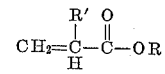

wherein R is selected from the group consisting of hydrogen and an alkyl radical containing from about 1 to 12 carbon atoms and R' is selected from the group consisting of hydrogen and methyl. Typical acrylate materials which may be used are methyl methacrylate, ethyl acrylate, propyl acrylate, butyl acrylate, butyl methacrylate, propyl methacrylate, lauryl acrylate, 2-ethylhexylacrylate, ethyl methacrylate and the like. Copolymers of vinyl chloride and vinylidene chloride, acrylonitrile with vinyl chloride, vinyl bromide, and similar halogenated vinyl compounds may be prepared by the process of the invention. Esters, such as vinyl esters having the formula:

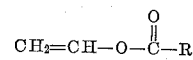

wherein R is an alkyl radical containing from 2 to 18 carbon atoms, may also frequently be employed with benefit. Typical monomers falling within this classification are vinyl acetate, vinyl butyrate, vinyl stearate, vinyl laurate, vinyl myristate, vinyl propionate and the like.

Typical copolymerizable acids are acrylic acid, methacrylic acid, itaconic acid, citraconic acid, maleic acid, fumaric acid, oleic acid, vinylbenzoic acid, and the like.

Advantageously, the synthetic polyester resins which are prepared by reacting terephthalic acid and dialkyl terephthalics or ester-forming derivatives thereof, with a glycol of the series $HO(CH_2)_nOH$, where "H" is a whole number within the range of 2–10 and having reactive olefinic linkages within the polymer molecule are readily utilized in the practice of the invention. Such polyesters also may include copolymerized therein up to 20 percent by weight of a second acid or ester thereof having reactive olefinic unsaturation, such as fumaric acid, maleic acid, itaconic acid, tetrahydrophthalic acid, and the like. Polyesters containing olefinic unsaturation are readily reacted with monomeric olefinic materials, such as the alkenyl aromatic monomers of the general formula:

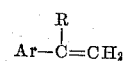

wherein "Ar" represents an aromatic hydrocarbon radical, or aromatic halohydrocarbon radical of the benzene series, and "R" is hydrogen or the methyl radical. Examples of alkenyl aromatic monomers are styrene, α-methylstyrene, ortho-methylstyrene, meta-methylstyrene, para-methylstyrene, ar-ethylstyrene, ar-vinylxylene, ar-chlorostyrene, and ar-bromostyrene; beneficially, if desired, other olefinically unsaturated polymerizable monomeric materials may be utilized such as acrylates and methacrylates, acrylonitrile, divinylbenzene, vinyl acetate, vinyl butyrate, and the like.

A number of difunctional monomeric constituents are readily employed in the invention. Advantageously, with the vinyl or alkenyl aromatic type monomers, suitable difunctional cross linking agents as divinylbenzene, diethylene glycol dimethacrylate, diallyl fumarate, diallyl phthalate, and the like are readily utilized.

The porous polymer particles for the practice of the present invention are preferably prepared by utilizing at least 10 mole percent of a cross linking agent when vinyl or vinylidene type monomers are used. It is essential that the desired product be provided with sufficient cross linking in the polymer to prevent significant swelling thereof in the presence of water or solvent. Such swelling closes or reduces the dimensions of the pores in many cases to the point where the product loses its desirable characteristics. Generally, it is desirable to maintain a highly cross linked rigid polymer particle in order that they may be readily subjected to heat without significant swelling, deformation or tendency to adhere to one another.

Accordingly, the choice of solvents is equally wide depending upon the particular monomer system that is utilized for the production of the porous polymeric material. The solvent should not be such a good solvent for the polymer that it is completely miscible in all proportions, nor should the solvent be a material which is a non-solvent for the monomer. Generally, materials which are completely soluble result in a polymer product which has no apparent pore size and is simply swollen by the solvent whereas polymeric materials produced by the use of non-solvents result in a pore size that is much too large for such operations as the selective adsorption and the like. Suitable solvents for the preparation of particles utilized in the method of the invention are readily prepared by admixing the solvents and non-solvents or alternately by selecting a suitable solvent having the desired characteristics. Usually for convenience and economy, it is preferable to employ a mixture of solvents, i.e., a solvent and non-solvent which will result in the desired product.

Suitable solvent mixtures are readily determined for the preparation of specific polymer systems by use of the relationship: $\delta = \delta_0 \pm 0.8$ wherein $\delta$ is the solubility parameter for the solvent system and $\delta_0$ is the solubility parameter for the polymer. The solubility parameters are discussed in "Some Factors Affecting the Solubility of Polymers," by P. A. Small, Journal of Applied Chemistry 3, 71 (1953) and also by Harry Burnell in the "Interchemical Review," 14, 3–16, 31–46 (1955). For mixed solvents, the value of $\delta$ is readily calculated by additive averaging on a weight basis. The same technique is also used to determine $\delta_0$ for copolymers including those which are highly cross linked, insoluble and non-swellable. Some typical values for $\delta_0$ are: polystyrene, 9.1; polydivinylbenzene, 8.8; polymethyl methacrylate, 9.3; polyethyl methacrylate, 9.1; poly-n-propyl methacrylate, 8.9; poly-n-butyl methacrylate, 8.7; polymethyl acrylate, 9.7; polyethyl acrylate, 9.2; polybutyl acrylate, 8.7; polyvinyl acetate, 9.4; polyethylene dimethacrylate, 9.2; polyethylene diacrylate, 9.5.

Beneficially, the following conditions appear most advantageous for the preparation of porous particles when alkenyl aromatic monomers, such as styrene, are solvent or diluent mixtures which have a cohesive energy density of from about 65 to 85 and beneficially between about 70 and 75. The cohesive energy density (C.E.D.) is $$\frac{\Delta H_{vap} - RT}{V}$$

wherein $\Delta H_{vap}$ is the molar heat of vaporization, R is the gas constant, T is temperature in degrees, Kelvin and V is the molar volume (C.E.D.=$\delta^2$). Solvents or solvent mixtures having a cohesive energy density approaching 80 to 85 when used with alkenyl aromatic resinous polymers, such as styrene-divinylbenzene copolymers give rise to very fine porous networks, whereas solvents or solvent mixtures having cohesive energy densities approaching 65 result in relatively coarse porous networks.

In general, the value of $\delta$ approaches that of $\delta_0$, the pore size of the polymer decreases and as these values diverge the pore size becomes greater.

Porous polymers for the practice of the present invention may be made by mass polymerization of the solvent-polymerizable material mixture or the mixture may be disposed in the form of droplets in a suitable heat transfer medium.

Usually, it is desirable to employ polymer particles of a relatively small size in order that a maximum surface be presented to the aqueous dispersion being treated. Usually, the optimum size is determined by the particular characteristics of the aqueous dispersion being treated. In order to obtain maximum and most rapid adsorption or uptake of the undesired components a relatively small particle size is preferable as this presents a maximum of surface and does not require a long period for the diffusion of the undesired components into the interstitial spaces of the porous polymer particles. However, a theoretical limit is reached when the particle is sufficiently small that it contains only one pore. However, generally particles of such small size are extremely difficult to separate from the aqueous dispersion by practical and economic means. Usually, porous particles having a size of about 5–100 microns are found most desirable for commercial and economic treatment of aqueous dispersions. Within this range the treated dispersion containing the polymer particles may be separated from the polymer particles by the simple expedient of filtering. Yet, sufficient surface of the particles is available to permit the dispersion to contact an adequate surface area of the aqueous dispersion and allow removal of the undesired components in a commercially practical time. Generally, it is advantageous to utilize particles that are generally spherical in nature and advantageously of generally similar size. Such systems composed of spherical particles of generally like sizes are readily filtered at a high rate and exhibit excellent flow characteristics when dry which leads to easy handling. As they are not as readily damaged by handling as are particles of other geometric configurations the spherical particle tends to markedly reduce any tendency toward dusting or fracture.

In the practice of the present invention, usually it is necessary only to admix the porous particles with the aqueous dispersion being treated in order to accomplish the desired result. If the quantity of undesirable material is sufficiently high, usually the treatment may be repeated until the water dispersed organic material has been reduced in concentration to a tolerable or desirable level. The time of treatment as is obvious will vary with temperature, the size of the porous particles being used, the nature of the organic material being removed, as well as the temperature and viscosity of the aqueous dispersion being treated. The use of porous particles in accordance with the present invention provides an advantageous means of treating aqueous dispersions of all natures, be they acid, base or neutral and removing organic material having a molecular dimension of less than about 300 Angstroms therefrom. After the aqueous dispersion and the porous particles have reached an equilibrium and all of the undesirable material that can be carried by the particles is contained therein, the dispersions and particles may be separated by any convenient means, such as filtration, centrifugation, and the like. The particles are readily regenerated by a treatment with water or similar elutriation agent. In most cases, water is an adequate elutriant. However, in certain instances it may be desirable to utilize low molecular weight organic solvents, such as alcohols such as methyl alcohols, ethyl alcohols, propyl alcohols, isopropyl alcohols, and the like, or aqueous solutions of such alcohols. The alcohol may be readily removed from the particle by means of steam or simple water washing. Oftentimes the porous particles are readily regenerated by means of contact with water either at ambient temperatures or at higher temperatures. Conveniently, regeneration may be accomplished in a similar manner to that used to treat the dispersion from which the undesired material is being removed. The particles may be slurried in the water or simply allowed to stand in water or alternately the particles may be retained in a column and water forced or drawn through. Conveniently, continuous elutriation may be done by means of conventional undercurrent flow techniques.

By way of further illustration, porous particles were prepared in the following manner:

A reaction vessel was charged with 5 mole percent divinylbenzene, 95 mole percent styrene, and twice the volume of the monomeric materials of a mixture of 50 parts of toluene and 50 parts of octane. The relationship $\delta = \delta_0 \pm 0.8$ was maintained and 0.100 percent by weight benzoyl peroxide based on the total weight of the monomer charge. The reaction vessel was flushed with a sufficient quantity of nitrogen to remove at least a major portion of the air present. It was then sealed and placed in a temperature controlled liquid bath and polymerized for 24 hours at a temperature of 75° centigrade, 48 hours at 85° centigrade, 48 hours at 110° centigrade, and a further 48 hours at 120° centigrade. The resultant polymer was then ground to pass a 200 mesh U.S. sieve size screen.

A solution was prepared of 1 percent by weight of a water-soluble surfactant which chemically was nonylphenyl polyethylene glycol ether containing 9 oxyethylene groups in the polyoxyethylene chain, 5 parts of the porous polymer by weight prepared were added to 95 parts by weight of the surfactant solution and the surface tension of the solution was measured with a DuNouy tensiometer.

The initial surface tension of the solution was about 31.5 dynes per centimeter. After treatment with 5 parts of the porous polymer, the surface tension of the solution raised to about 51.2 dynes per centimeter.

In a manner similar to the foregoing illustration, porous polymer prepared having a 50 percent void space adsorbed 45 percent by weight based on the weight of the porous polymer of wetting agent in the 5 percent solution when sufficient polymer was added to increase the surface tension from 32 dynes per centimeter to about 35 dynes per centimeter. When sufficient polymer was added to increase the surface tension to about 65 dynes per centimeter, the weight of the wetting agent based on the resin was about 20 percent. A wetting agent stabilized synthetic resinous latex containing about 8 percent by weight of surface-active agent based on solids was treated by means of a porous resin having a particle size of approximately 10 microns. The void space within the resin particles was approximately 35 percent. 100 parts of the latex, a copolymer of about 70 parts of styrene and 30 parts of butadiene, and 5 percent solids was treated with successive 25 part by weight portions of porous resin allowed to stand for five minutes during the treatment and the porous particles were then separated by means of filtration. After treatment, a film was cast, air dried, and tested with water spotting by placing a drop of water on the surface of the fused film. The results are set forth in the following table wherein the comments relative to the performance of the film relate to the appearance of the film and the spreading of the water drop on the surface thereof.

Table

| Sample: | Performance of film |
|---|---|
| Control | Immediate whitening; swelling. |
| 1 treatment | Less spreading; mild whitening. |
| 2 treatments | Still less spreading; very mild whitening. |
| 3 treatments | Very little spreading; no whitening. |
| 4 treatments | Do. |

In a manner similar to the foregoing illustrations, wetting agents, such as sodium methyl oleoyl laurate, dioctyl ester of sodium sulfosuccinic acid, sodium octylbenzene sulfonate, sodium stearate, dodecylbenzene sodium sulfonate, N-cetyl-ethyl morpholinium ethosulfate, polyoxyethylene sorbitol hexaoleate, butyl ricinoleate, sodium dodecyl diphenyl oxide disulfonate, stearamido propyldimethyl-$\beta$-hydroxy ethyl ammonium nitrate, glyceryl monostearate, coco-fatty acid diethanolamide, ammonium tridecylbenzene sulfonate, potassium lauryl sulfate, triethanolamine lauryl sulfate, lauryl pyridinium, nonyl phenoxy polyethylene ethanol, triethanolamine oleate, sodium lauryl sulfate, potassium xylene sulfonate, $(capryl)_5$-$Na_5(P_3O_{10})_2$, and cetyl dimethyl amine oxide, are readily removed from aqueous solutions by treatment with porous resins in accordance with the present invention.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of separating dispersed organic material having a molecular dimension of less than about 300 Angstroms from an aqueous dispersion comprising contacting the aqueous dispersion with a finely divided adsorbent comprising a plurailty of synthetic resinous sphere-like particles, the synthetic resinous particles having a plurality of pores communicating with the surface thereof and the pores having diameters ranging up to about 300 Angstroms the synthetic resinous particles being prepared by the copolymerization of 5 mole percent divinylbenzene with 95 mole percent styrene in the presence of a solvent equal to twice the total volume of the divinylbenzene and styrene, the solvent being a mixture of 50 parts of toluene and 50 parts of octane, to form a rigid cross-linked solid and subsequently separating the resinous particles from the aqueous dispersion.

2. The method of claim 1 wherein the dispersed organic material is a surface-active agent.

3. The method of claim 1 wherein the resinous particles are dispersed within the dispersion and agitated and subsequently separated by filtration.

4. The method of claim 1 wherein the aqueous dispersion is a synthetic resinous latex.

5. The method of claim 4 wherein the organic material is a surfactant.

References Cited by the Examiner

UNITED STATES PATENTS 3,147,214   9/1964   Kressman et al. _____ 210—37

MORRIS O. WOLK, *Primary Examiner.*

E. G. WHITBY, *Assistant Examiner.*